(12) United States Patent
Ahn (10) Patent No.: US 9,515,302 B2
(45) Date of Patent: Dec. 6, 2016

(54) RECHARGEABLE BATTERY PACK (71) Applicant: SAMSUNG SDI CO., LTD., Yongin-si, Gyeonggi-do (KR)

(72) Inventor: Byung-Kook Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 322 days.

(21) Appl. No.: 14/156,395

(22) Filed: Jan. 15, 2014

(65) Prior Publication Data
US 2015/0050525 A1 Feb. 19, 2015

(30) Foreign Application Priority Data

Aug. 13, 2013 (KR) .................. 10-2013-0096163

(51) Int. Cl.
*H01M 2/02* (2006.01)
*H01M 2/10* (2006.01)
*H01M 10/42* (2006.01)

(52) U.S. Cl.
CPC ......... *H01M 2/1061* (2013.01); *H01M 10/425* (2013.01); *H01M 2/0277* (2013.01); *H01M 2/0285* (2013.01); *H01M 2/0287* (2013.01); *H01M 2010/4271* (2013.01); *H01M 2220/30* (2013.01)

(58) Field of Classification Search
CPC .................. H01M 10/425; H01M 2/1038; H01M 2/1022; H01M 2/1061
See application file for complete search history.

(56) References Cited

U.S. PATENT DOCUMENTS

| 2008/0124624 | A1* | 5/2008 | Lin ..................... H01M 2/0207 429/163 |
| 2012/0129027 | A1 | 5/2012 | Hong |
| 2012/0214026 | A1 | 8/2012 | Moon et al. |
| 2012/0270074 | A1* | 10/2012 | Koh .................... H01M 2/0212 429/7 |

FOREIGN PATENT DOCUMENTS

| EP | 2515358 A1 | 10/2012 |
| JP | 2004-273371 A | 9/2004 |
| JP | 2012-190685 A | 10/2012 |
| KR | 1994-0027446 A | 12/1994 |
| KR | 10-2010-0033041 A | 3/2010 |

OTHER PUBLICATIONS

Machine Translation of: JP 2004/273371, Morita et al., Sep. 30, 2004.*

(Continued)

*Primary Examiner* — Kenneth Douyette
(74) *Attorney, Agent, or Firm* — Lewis Roca Rothgerber Christie LLP (57) ABSTRACT

A rechargeable battery pack includes a frame accommodating a unit cell including a rechargeable battery; a protection circuit module electrically connected to the unit cell and in the frame; and a pair of cases coupled to opposite sides of the frame and accommodating the unit cell and the protection circuit module, and wherein the frame has coupling grooves in the sides and wherein each of the pair of cases comprises coupling protrusions, the coupling protrusions of each case being alternately coupled to the coupling grooves.

14 Claims, 11 Drawing Sheets

(56) References Cited

OTHER PUBLICATIONS

Korean Patent Abstracts of 10-0132406 B1 which corresponds to KR 1994-0027446 A issued Apr. 25, 1998, as listed above, 1 page.
Extended European Search Report dated May 27, 2014 for European Application No. 14162803.2, 8 pgs.
EPO Office action dated Dec. 21, 2015, for corresponding European Patent application 14162803.2, (6 pages).
EPO Office Action dated Sep. 22, 2016, for corresponding European Patent Application No. 14162803.2 (5 pages).

* cited by examiner

RECHARGEABLE BATTERY PACK

CROSS-REFERENCE TO RELATED APPLICATION

This application claims priority to and the benefit of Korean Patent Application No. 10-2013-0096163 filed in the Korean Intellectual Property Office on Aug. 13, 2013, the disclosure of which is incorporated herein in its entirety by reference.

BACKGROUND

1. Field

The described technology relates generally to a tablet-type rechargeable battery pack.

2. Description of the Related Art

Unlike a primary battery, a rechargeable battery iteratively performs charging and discharging. A rechargeable battery having a relatively small capacity is used, for example, in small-sized portable electronic devices such as a mobile phone, a tablet computer, a laptop computer, and a camcorder, and a rechargeable battery having a relatively large capacity is used, for example, to power a motor of an electric bicycle, a scooter, an electric vehicle, and a fork lift.

Depending on the type of devices using the rechargeable battery, a unit cell or a pack of a plurality of unit cells being in an electrically connected state may be used as the rechargeable battery. For example, the rechargeable battery may include a plurality of unit cells, a protection circuit module electrically connecting the unit cells and protecting the unit cells, and a frame for receiving the unit cells and the protection circuit module.

For example, a rechargeable battery pack used in the tablet computer may be formed by installing a unit cell in the frame and attaching the unit cell and the frame to the tablet computer. In one case, strength, according to a drop test, is not critical to a use of the rechargeable battery pack as the rechargeable battery pack is not separable from the tablet computer by a user.

However, in another case, the rechargeable battery pack may be separable from the tablet computer by the user. In this case, a strength of the rechargeable battery pack, according to the drop test, is relevant to the use of the rechargeable battery pack.

The above information disclosed in this Background section is only for enhancement of understanding of the background of the described technology and therefore it may contain information that does not form the prior art that is already known in this country to a person of ordinary skill in the art.

SUMMARY

Embodiments of the present invention provide a rechargeable battery pack having a tablet shape and having a high strength according to a drop test. In addition, embodiments of the present invention provide a rechargeable battery pack being thinner in thickness.

A rechargeable battery pack according to an embodiment of the present invention includes a frame accommodating a unit cell including a rechargeable battery; a protection circuit module electrically connected to the unit cell and in the frame; and a pair of cases coupled to opposite sides of the frame and accommodating the unit cell and the protection circuit module, the frame has coupling grooves in the sides, and each of the pair of cases comprises coupling protrusions, the coupling portions of each case being alternately coupled to the coupling grooves.

The coupling grooves may be alternately located in a top portion and a bottom portion of the sides of the frame along a height of the frame, and the coupling protrusions on each case may be alternately coupled to the coupling grooves.

The frame may have insertion grooves continuously extending along the sides thereof, may be configured for insertion of outer edges of the cases, and may be open to the coupling grooves.

The coupling grooves may extend from the respective insertion grooves to the outside of the frame in a direction perpendicular to the height of the frame.

The frame may include a cell barrier partitioning the insertion grooves along the height of the frame, and the cell barrier may be a zigzag shape alternately connecting the coupling grooves to each insertion groove.

Each of the pair of cases may further include a plate portion corresponding to the unit cell and one side of the frame; an insertion portion extending perpendicularly from the plate portion and located in the corresponding insertion groove; and extension portions extending from an end of the insertion portion and may include the coupling protrusions.

The coupling protrusions may protrude perpendicularly from the extension portions and may be coupled with the corresponding coupling grooves.

Each coupling protrusion may include a pair of side barriers extending perpendicularly from the extension portion; an inclination barrier extending entirely between the side barriers and extending at an angle from the extension portion; and a connection barrier extending entirely between the side barriers and on a parallel plane with the extension portion.

The side barriers, a top edge of the connection barrier, and a bottom edge of the inclination barrier may form a rectangular shape.

A width of the connection barrier may be substantially equal to a width of the coupling groove, and the side barriers may be close to an inner wall of the coupling groove.

The coupling protrusion may be connected to the extension portion at an angle and three sides of the coupling protrusion may not be directly connected to the extension portion.

The coupling grooves may be located at a center of the frame along a height of the frame, and the coupling protrusions of each of the pair of cases may be alternately coupled to the coupling grooves.

The frame may include a synthetic resin material and the case may include a metal material.

The unit cell may include two unit cells facing each other, and the frame may include a circuit installation portion and the protection circuit module at a space between the two unit cells.

The circuit installation portion may include a through-hole at a portion corresponding to a lead tab of one of the unit cells; a location setting protrusion protruded from a side of the through-hole and configured to set a location of the lead tab and to support the protection circuit module; and a circuit support protrusion at a corner of the circuit installation portion and protruded to be higher than the location setting protrusion and configured to support at least one side surface of the protection circuit module.

The frame may have a penetration portion extending through the frame, and a connector of the protection circuit module may extend through the penetrating portion to be outside of the frame.

As described, the rechargeable battery pack according to an example embodiment includes a pouch-type unit cell accommodated in a frame, and a pair of cases coupled to opposite sides (e.g., lateral sides) of the frame and surrounding the unit cell and a protection circuit module.

That is, because the rechargeable battery pack is formed in a tablet shape and the unit cell and the protection circuit module are surrounded by the frame and the cases, the rechargeable battery pack may have a required (e.g., high) strength according to a drop test. In addition, the rechargeable battery pack may be used in a tablet computer and may be separable from the tablet computer by a user.

In addition, according to an example embodiment, coupling grooves in the frame are formed along one direction and coupling protrusions of each of the pair of cases are alternately coupled to the coupling grooves, and therefore the overall thickness of the rechargeable battery pack can be reduced by reducing a gap between the pair of cases.

DETAILED DESCRIPTION

Aspects and features of the present invention will be described more fully hereinafter with reference to the accompanying drawings, in which example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that when an element or layer is referred to as being "on" or "connected to" another element or layer, it may be directly on or connected to the other element or layer or intervening elements or layers may be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

Figure 1:
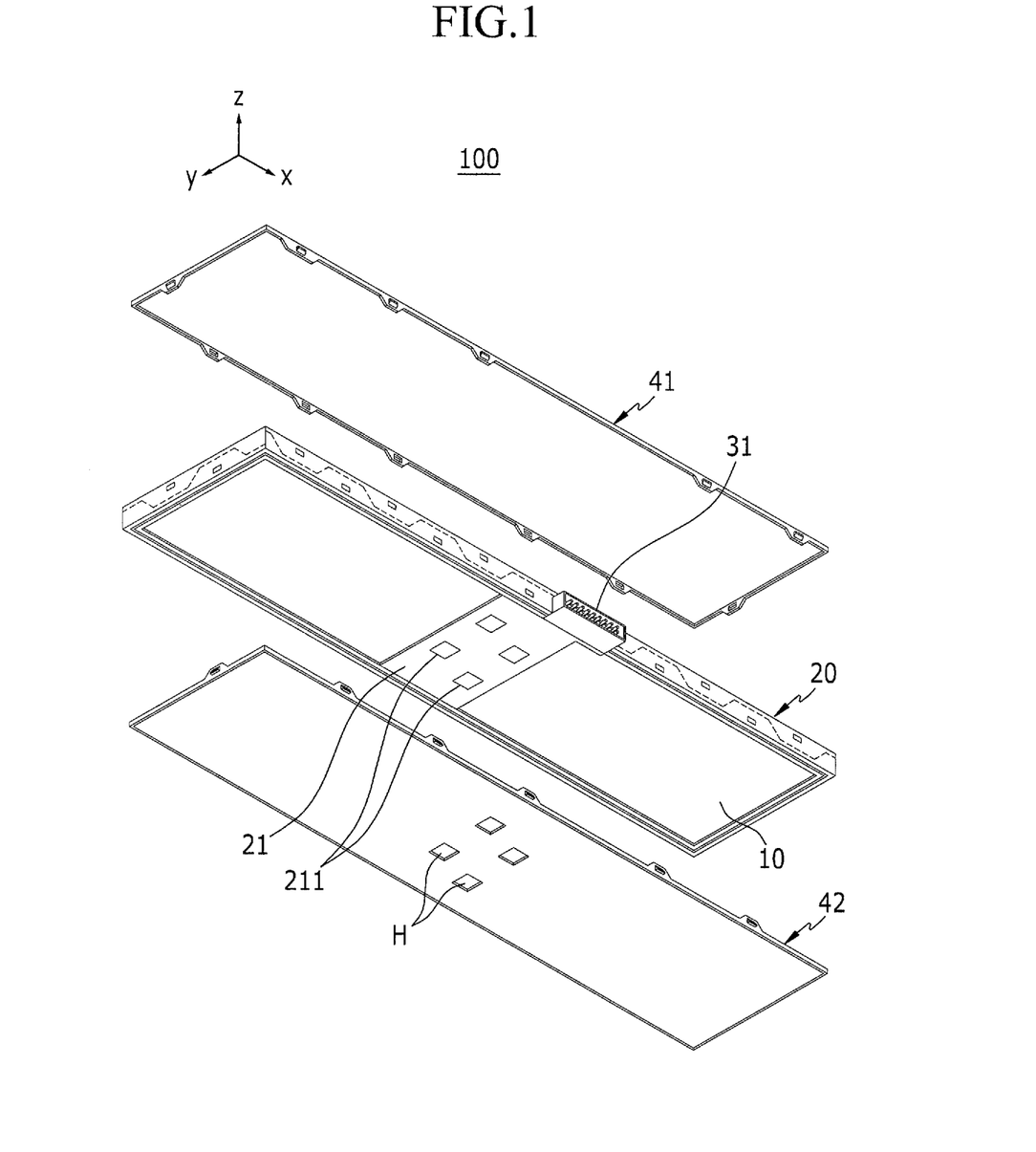
FIG. 1 is an exploded perspective view of a rechargeable battery pack according to a first example embodiment of the present invention.

FIG. 1 is an exploded perspective view of a rechargeable battery pack 100 according to a first example embodiment of the present invention. Referring to FIG. 1, the rechargeable battery pack 100 according to the first example embodiment includes a unit cell 10 formed of a rechargeable battery, a frame 20 accommodating (e.g., surrounding a periphery of) the unit cell 10, a protection circuit module 30 (refer to FIG. 3), and a pair of cases 41 and 42.

In the first example embodiment, the rechargeable battery pack 100 includes two unit cells 10, but may include a plurality of unit cells 10 (e.g., more than one or two unit cells 10). Each unit cell 10 may be formed as, for example, a pouch-type rechargeable battery.

The frame 20 surrounds an external circumference of thin sides of the unit cells 10 (i.e., the frame 20 surrounds a periphery of the unit cells 10), and the pair of cases 41 and 42 cover top and bottom surfaces of the unit cells 10. For example, the frame 20 may be made of a synthetic resin material, and the pair of cases 41 and 32 may be made of a metal material (e.g., stainless steel).

The protection circuit module 30 is electrically connected to the unit cell 10 and protects (e.g., is configured to protect) the unit cells 10. In addition, the unit cells 10 and the protection circuit module 30 can be protected from an external impact by the frame 20 and the pair of cases 41 and 42 coupled to the frame 20. The protection circuit module 30 is formed by mounting circuit elements to a printed circuit board and protects the unit cells 10 from over-charging, over-discharging, over-current, and external short-circuit.

Each of the pair of cases 41 and 42 are coupled to openings on opposite sides of the frame 20 to protect the unit cells 10 and the protection circuit module 30, and each is provided with insulating tape at an inner side thereof so that electric insulation of the unit cells 10 and the protection circuit module 30 may be further improved. In addition, the insulating tape can further improve impact safety for protection of the unit cells 10 from an external impact.

Figure 2:
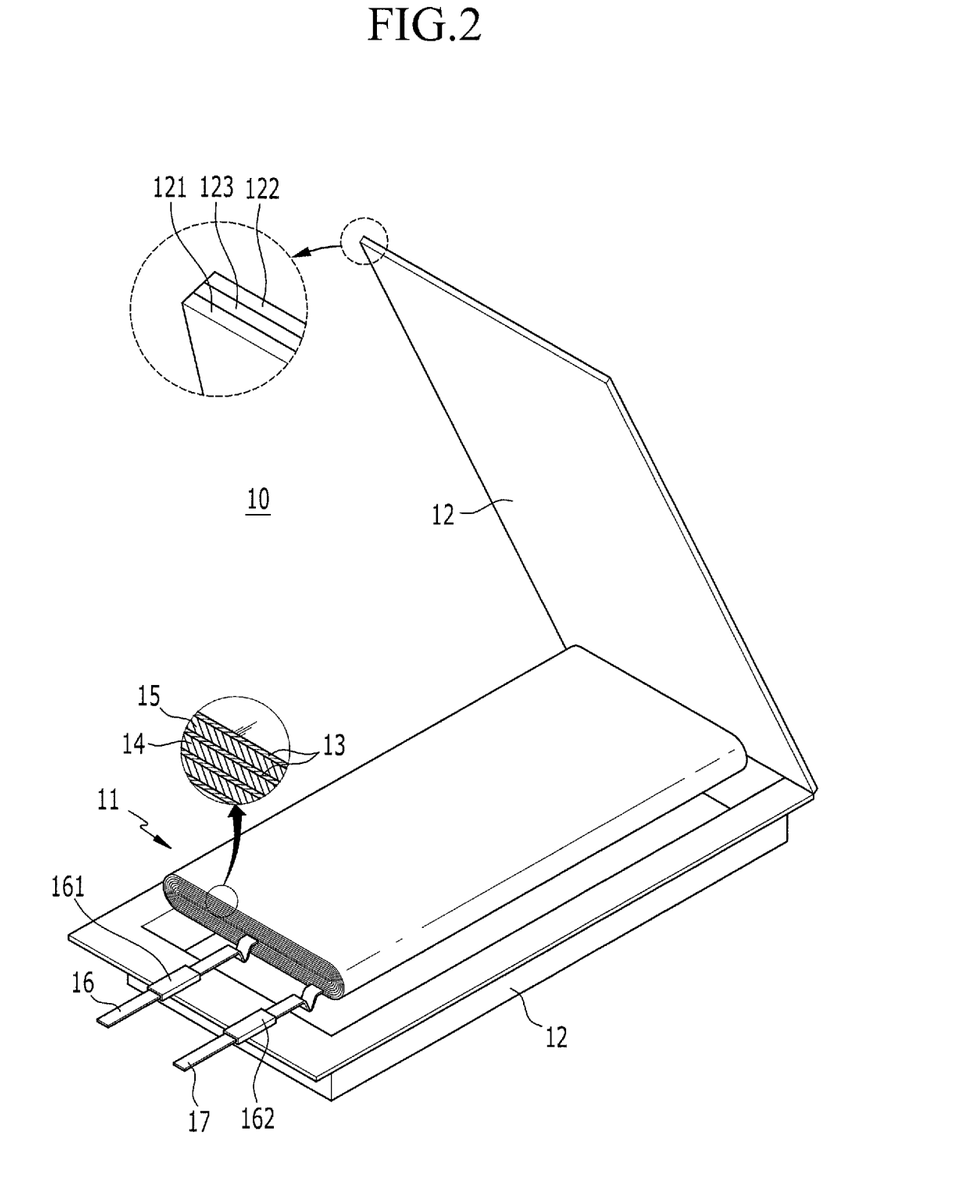
FIG. 2 is an exploded perspective view of the unit cell illustrated in FIG. 1.

FIG. 2 is an exploded perspective view of one of the unit cells 10 illustrated in FIG. 1. Referring to FIG. 2, the unit cell 10 may be formed as a pouch-type rechargeable battery and includes an electrode assembly 11 capable of charging and discharging and a pouch 12 accommodating (e.g., surrounding) the electrode assembly 11.

The electrode assembly 11 is formed by spirally winding a positive electrode 14 and a negative electrode 15 and interposing a separator 13 therebetween. The electrode assembly 11 has a substantially flat shape and lead tabs (e.g., positive electrode and negative electrode lead tabs 16 and 17) extend from one side thereof. For example, the separator 13 may be formed of a polymer film that transmits lithium ions therethrough.

The positive electrode 14 includes a coated region in which an active material is coated on a metallic thin-film current collector and an uncoated region in which the active material is not coated on the current collector, and thus, the current collector is exposed. For example, the positive electrode 14 may be formed of an aluminum thin-film. The positive electrode lead tab 16 is connected to the uncoated region of the positive electrode 14.

The negative electrode 15 includes a coated region in which an active material that is different from the active material of the positive electrode 14 is coated on a metallic thin-film current collector and an uncoated region in which the current collector is not coated with the active material and thus, the current collector is exposed. For example, the negative electrode 15 may be formed of a copper thin-film. The negative electrode lead tab 17 is separated from the positive electrode lead tab 16 and connected to the uncoated region of the negative electrode 15.

One side of the pouch 12 is formed having a partially concave structure to surround an external portion of the electrode assembly 11 and the other side is formed having a plane shape, and thus, edges of opposing sides of the pouch 12 corresponding to each other may be thermally welded so as to accommodate (e.g., surround) the electrode assembly 11.

The pouch 12 may be formed with a multi-layered sheet structure, and for example, includes a polymer sheet 121 forming an inner surface thereof and performing insulation and thermal fusion functions, a polyethylene terephthalate (PET) sheet, a nylon sheet, or a PET-nylon compound sheet 122 performing a protection function.

For example, the pouch 12 includes a metal sheet 123 provided between the polymer sheet 121 and the PET-nylon compound sheet 122 to provide mechanical strength and stiffness. For example, the metal sheet 123 may be formed of an aluminum sheet.

The positive electrode lead tab 16 and the negative electrode lead tab 17 extend from the same side of the electrode assembly 11. The positive electrode lead tab 16 and the negative electrode lead tab 17 protrude to the outside of the thermally welded pouch 12, and therefore, the electrode assembly 11 may be electrically connected through a side of the pouch 12.

In this case, insulation members 161 and 162 can electrically insulate the positive and negative electrode lead tabs 16 and 17, respectively, from the pouch 12 by coating the positive and negative electrode lead tabs 16 and 17 at a portion where they contact the pouch 12 and can improve insulation between the positive electrode lead tab 16 and the negative electrode lead tab 17.

Figure 3:
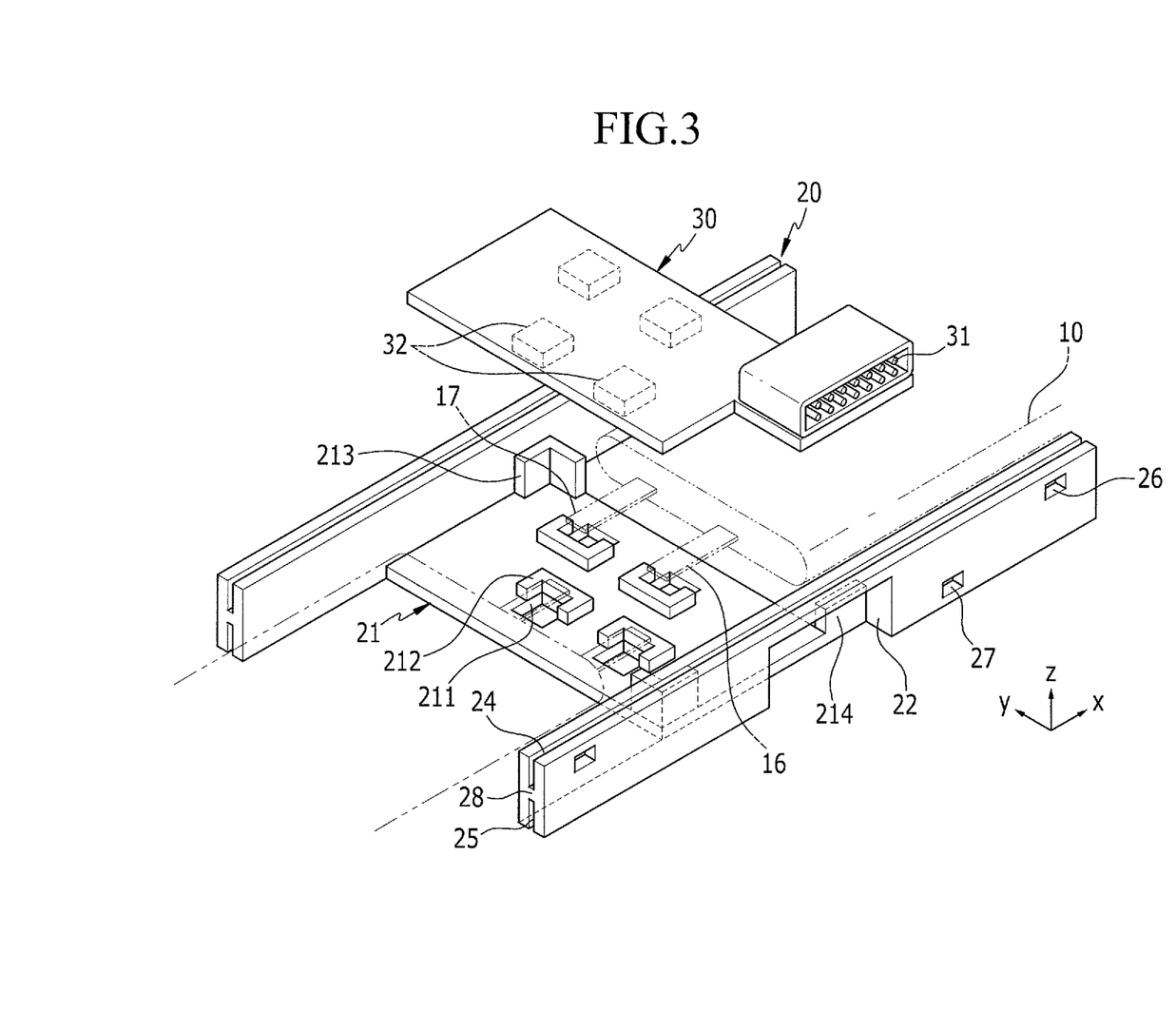
FIG. 3 is a partial perspective view of a frame, a unit cell, and a protection circuit module illustrated in FIG. 1.

FIG. 3 is a partially exploded perspective view of the frame 20 and the unit cells 10 illustrated in FIG. 1 and the protection circuit module 30. Referring to FIG. 3 and FIG. 1, in the rechargeable battery pack 100, the two unit cells 10 are located facing each other.

The frame 20 accommodates the two unit cells 10 by surrounding a periphery of the same, and a circuit installation portion 21 is at a space between the two unit cells 10, which are facing each other. That is, the circuit installation portion 21 is provided at a center of the frame 20 along the x-axis direction and at one side (i.e., a lower portion) of the frame 20 in the z-axis direction.

Therefore, the protection circuit module 30 may be located over the circuit installation portion 21 while being electrically connected to the two unit cells 10. That is, the circuit installation portion 21 and the protection circuit module 30 overlap each other in the z-axis direction.

For example, the circuit installation portion 21 includes a through-hole 211, a location setting protrusion 212, and a circuit support protrusion 213. The through-hole 211 is formed at portions respectively corresponding to the positive electrode lead tab 16 and the negative electrode lead tab 17 of each of the two unit cells 10 so as to enable approach of a welding machine, and thus the positive and negative electrode lead tabs 16 and 17 may be welded to corresponding welding portions 32 of the protection circuit module 30.

In addition, the case 42 is provided with through-holes H (refer to FIG. 1) corresponding to the through-holes 211 and the welding portions 32 so as to enable approach of the welding machine through through-holes H and 211 while the case 42 is coupled to the frame 20.

The location setting protrusion 212 protrudes from a side of the circuit installation portion 21 (e.g., protrudes along a z-axis direction) and extends along a side of the through-hole 211, sets a location of the corresponding positive electrode lead tab 16 or the negative electrode lead tab 17, and supports (e.g., contacts) the protection circuit module 30. That is, the location setting protrusion 212 protrudes from a top surface of the circuit installation portion 21 and sets the location of the corresponding positive or negative electrode lead tab 16 and 17 when the unit cells 10 are placed in the frame 20 for welding of the positive electrode lead tab 16 and the negative electrode lead tab 17. In addition, because the location setting protrusion 212 protrudes from the top surface of the circuit installation portion 21, a circuit portion of the protection circuit module 30 can be prevented from unnecessarily contacting the positive and negative electrode lead tabs 16 and 17.

The circuit support protrusion 213 is located at an outer edge in a diagonal direction (e.g., located at a corner) of the circuit installation portion 21 and protrudes from the top surface of the circuit installation portion 21 and contacts an inner wall of the frame 20. The circuit support protrusion 213 protrudes higher than the location setting protrusion 212 to support a side surface of the protection circuit module 30. That is, a location of the protection circuit module 30 on a plane (e.g., an x-y plane) may be set by the circuit support protrusion 213, and a location of the protection circuit module 30 in the z-axis direction may be set by the location setting protrusion 212 so that the protection circuit module 30 can be installed in the frame and supported by the circuit installation portion 21 such that it is stable.

The protection circuit module 30 includes a connector 31 at one side thereof, and the connector 31 extends to be outside of the frame 20 so as to supply power to a load (e.g., a device). For this purpose, the frame 20 includes a penetration portion 22 at one side of the circuit installation portion 21. The connector 31 of the protection circuit module 30 may be provided at an external side of the frame 20 through the penetration portion 22. Because a hook protrusion 214 is provided at an inner side of the penetration portion 22 to support a rear side of the connector 31 inserted to (e.g., inserted through) the penetration portion 22, the protection circuit module 30 may be more stably installed.

Figure 4:
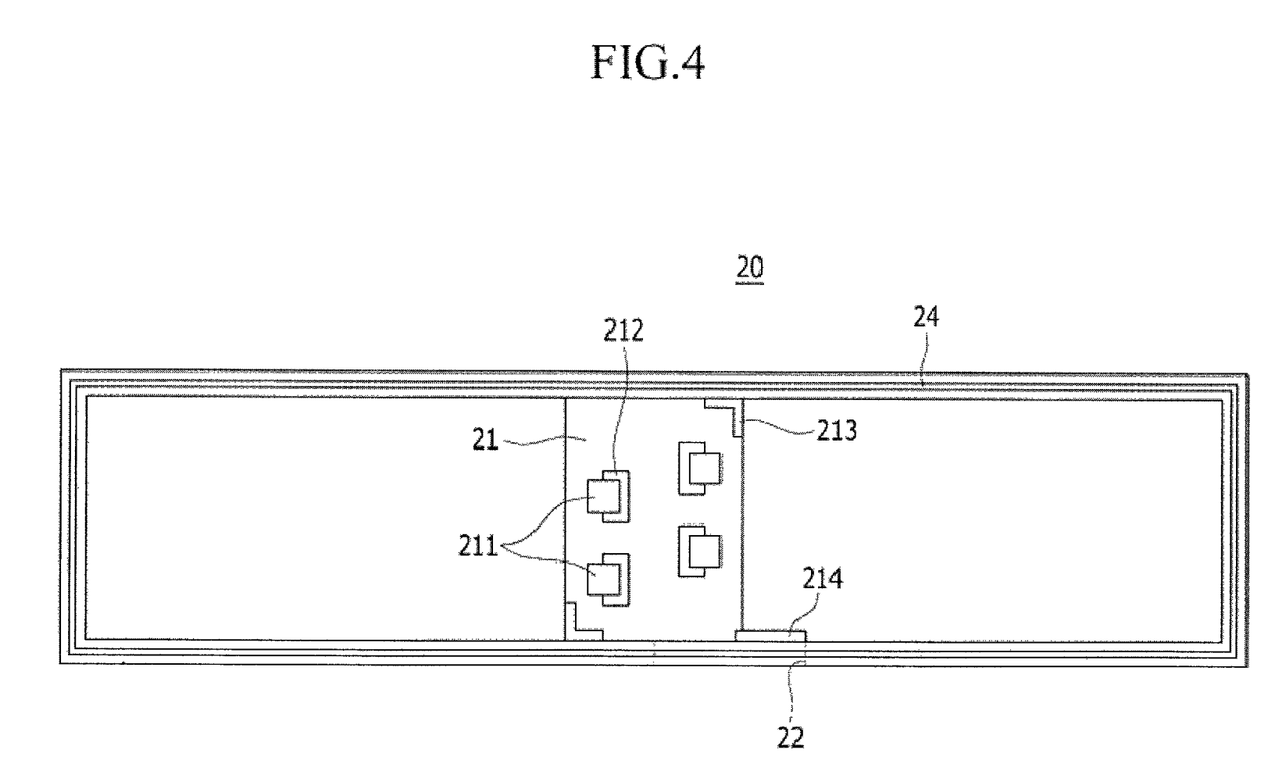
FIG. 4 is a top plan view of the frame illustrated in FIG. 1.
Figure 5:
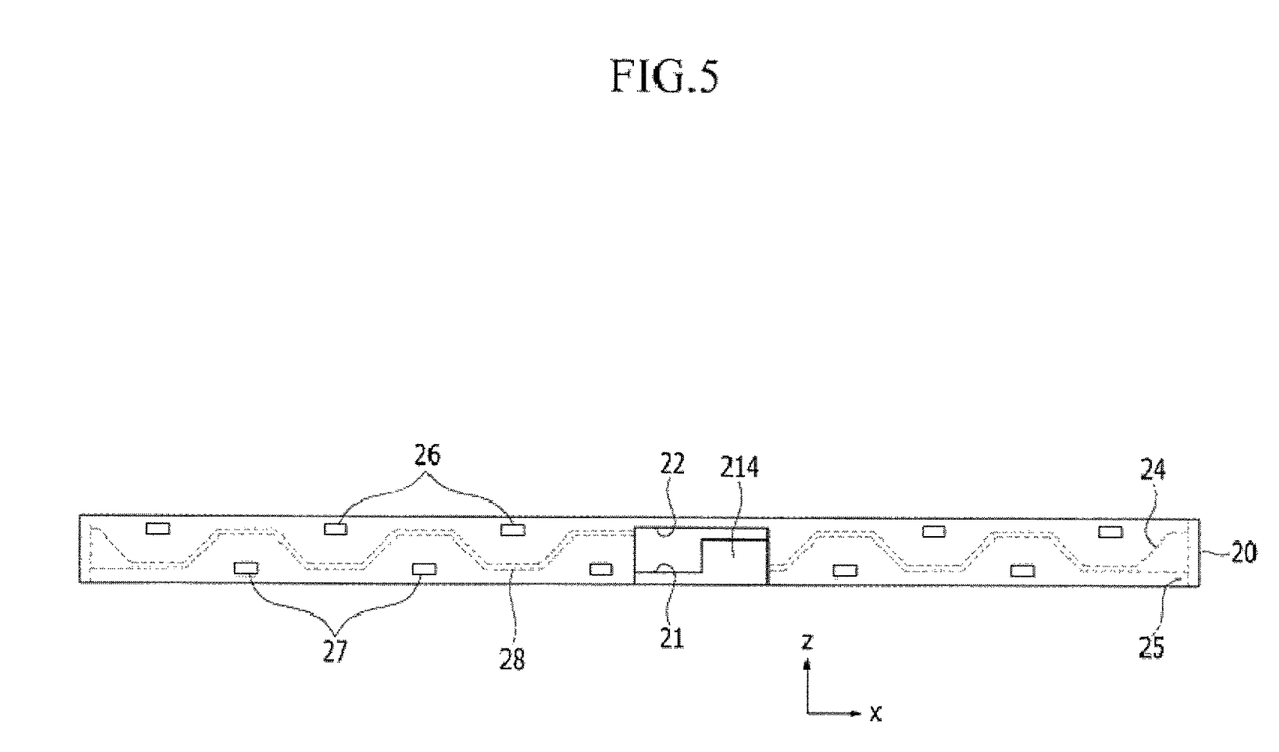
FIG. 5 is a side view of the frame illustrated in FIG. 4.

FIG. 4 is a top plan view of the frame 20 illustrated in FIG. 1, and FIG. 5 is a side view of the frame 20 illustrated in FIG. 4. Referring to FIG. 4 and FIG. 5, the frame 20 has insertion grooves 24 and 25 continuously formed along sides thereof configured for insertion of outer edges of the pair of cases 41 and 42, respectively, and coupling grooves 26 and 27 penetrating to the outside of the frame 20 from the insertion grooves 24 and 25 (e.g., coupling grooves 26 and 27 penetrate through a side of the frame 20 from the insertion grooves 24 and 25, respectively).

The coupling grooves 26 and 27 are formed at side surfaces of the frame 20 so as to be alternately connected to the pair of cases 41 and 42. For example, the coupling grooves 26 and 27 are alternately arranged at upper and lower portions of sides of the frame 20 along at least one direction (e.g., the x-axis direction and/or y-axis direction, refer to FIG. 1) so as to be alternately coupled to the pair of cases 41 and 42, respectively.

The frame 20 includes a cell barrier 28 partitioning the insertion grooves 24 and 25 between the pair of cases 41 and 42, respectively. The cell barrier 28 is formed in a zigzag shape to alternately expose the coupling grooves 26 and 27 to the insertion grooves 24 and 25, respectively.

Thus, referring to the z-axis direction, the coupling groove 26 coupled to the case 41 of the pair of cases 41 and 42 is located above the cell barrier 28, and the coupling groove 27 coupled to the other case 42 is located below the cell barrier 28. That is, the coupling grooves 26 and 27 are alternately arranged along the upper side and the lower side of the cell barrier in the z-axis direction and extend along the x-axis direction (and/or the y-axis direction, refer to FIG. 1).

Figure 6:
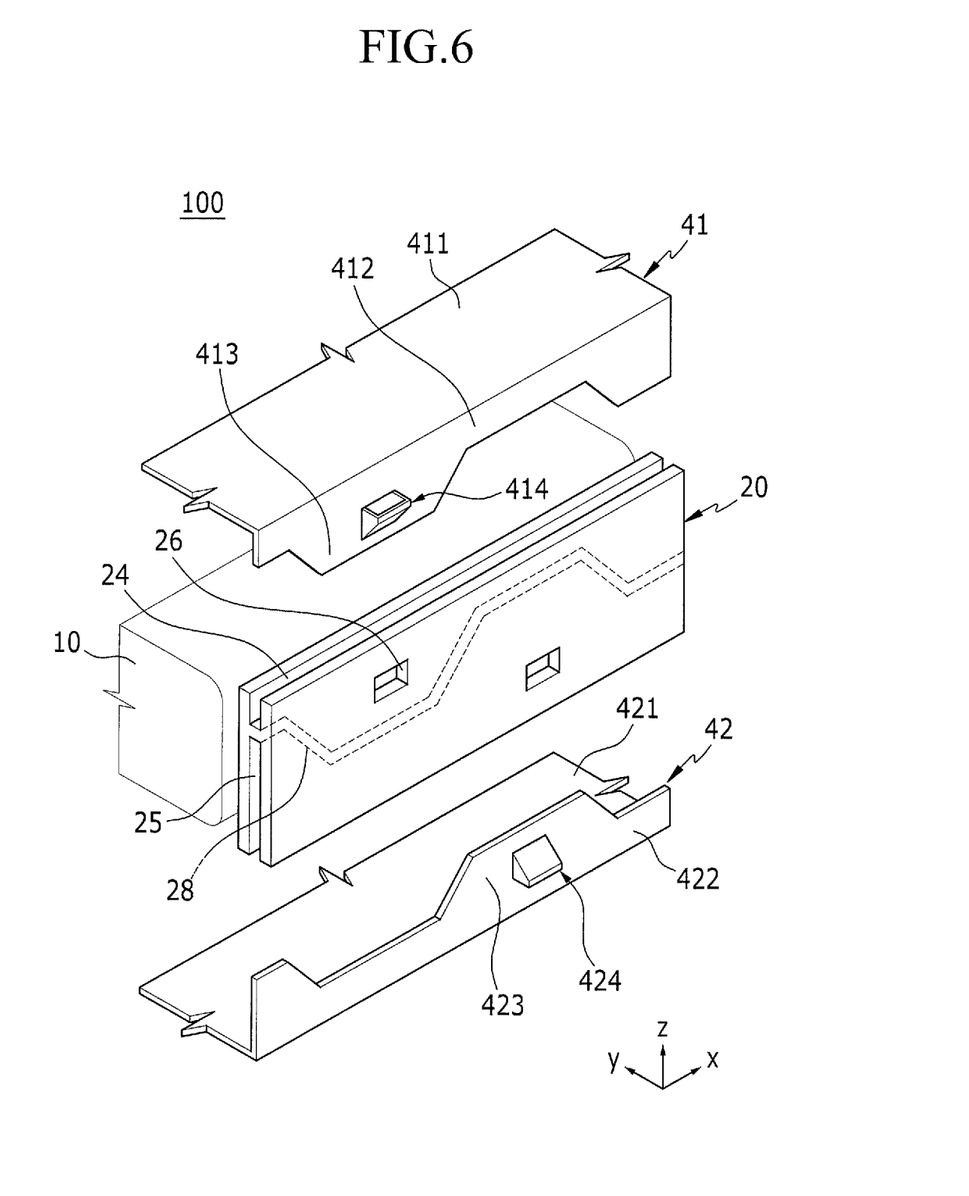
FIG. 6 is a partial perspective view of a pair of cases in the frame.

FIG. 6 is an exploded partial perspective view of the pair of cases 41 and 42 coupled to the frame 20. Referring to FIG. 6, in the rechargeable battery pack 100, the pair of cases 41 and 42 include plate portions 411 and 421 coupled to opposite sides of the frame 20 to surround the unit cell 10, insertion portions 412 and 422, extension portions 413 and 423, and coupling protrusions 414 and 424, respectively.

The plate portions 411 and 421 are formed having the shape of a plate to correspond to lateral sides (e.g., top and bottom surfaces) of the unit cells 10 and the side openings of the frame 20 to cover the unit cells 10 and the sides of the frame 20 in the z-axis direction. The insertion portions 412 and 422 are bent to be perpendicular to the plate portions 411 and 421 and inserted into the insertion grooves 24 and 25 formed in the openings in both sides of the frame 20 in the z-axis direction, respectively.

The extension portions 413 and 423 are provided along the insertion portions 412 and 422 to correspond to the insertion grooves 24 and 25, and extend from the insertion portions 412 and 422 and face the respective coupling grooves 26 and 27 in the insertion grooves 24 and 25 (refer to FIG. 6). The coupling protrusions 414 and 424 may protrude along the y-axis direction (or the x-axis direction, refer to FIG. 1) from the extension portions 413 and 423 and be coupled to the respective coupling grooves 26 and 27 (refer to FIG. 6).

In this case, the coupling grooves 26 and 27 are penetrated to an external side of the frame 20 in a direction perpendicular to the insertion grooves 24 and 25 (y-axis direction or x-axis direction, refer to FIG. 1). Thus, the coupling protrusions 414 and 424 protrude to be perpendicular to the extension portions 413 and 423 (y-axis or x-axis direction, refer to FIG. 1) and are coupled to the coupling grooves 26 and 27.

Figure 7:
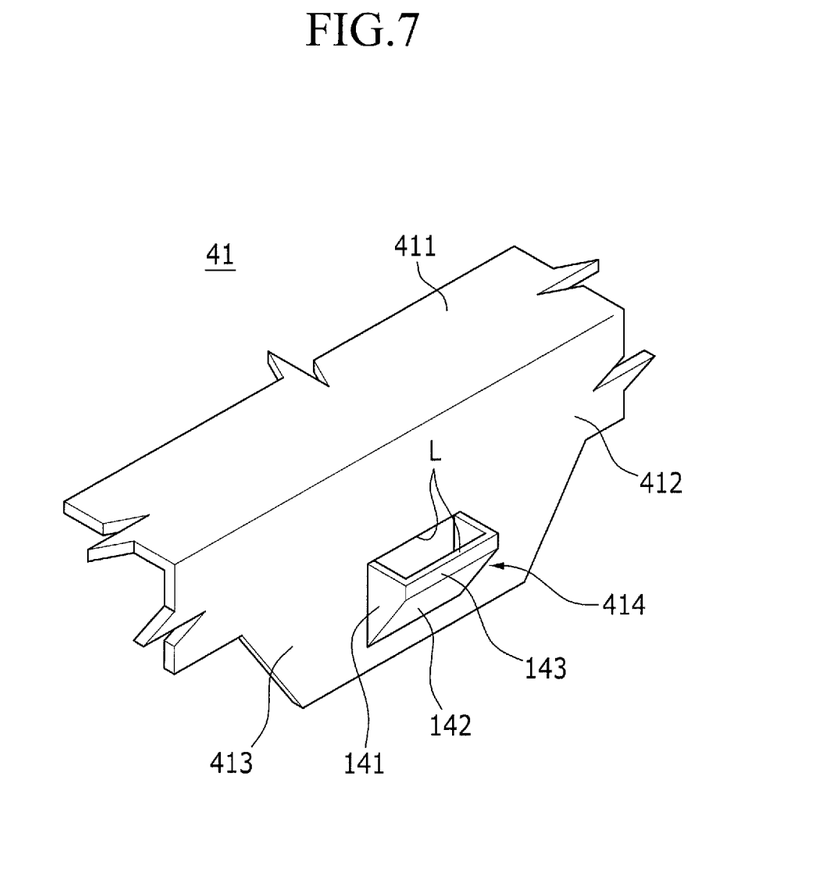
FIG. 7 is an enlarged partial perspective view of a coupling protrusion in the case.

FIG. 7 is an enlarged partial perspective view of the coupling protrusion 414 of the case 41. Because the coupling protrusions 414 and 424 are formed to have a similar shape, only one coupling protrusion 414 will be described for convenience.

Referring to FIG. 7, the coupling protrusion 414 is formed on the extension portion 413 and configured to be inserted into the insertion groove 24 and thus be coupled to the frame 20 and has a stereoscopic structure (e.g., a three-dimensional structure) that includes a pair of side barriers 141, an inclination barrier 142, and a connection barrier 143.

The pair of side barriers 141 are connected to the extension portion 413 and extend perpendicularly therefrom and are formed by cutting a line L along the extension portion 413 and performing a press process to partition according to the cutting line L and three other sides.

The inclination barrier 142 is connected to the pair of side barriers 141 in an inclined manner from a side of the extension portion 413 opposite to the cutting line L (e.g., the inclination barrier 142 is connected to the extension portion 413 at an angle). Thus, the inclination barrier 142 effectively induces insertion and coupling of the coupling protrusion 414 to the insertion groove 24.

The connection barrier 143 connects the pair of side barriers 141 to each other and is a plane parallel to the extension portion 413. In addition, a top portion of the connection barrier 143 and the side barriers 141 is formed by the cutting line L, which forms an open structure in the extension portion 413, and is coupled to the coupling groove 26. Thus, the coupling protrusion 414 can maintain a coupling force (e.g., a fastening force) with the coupling groove 26 in the frame 20 in the z-axis direction.

Figure 8:
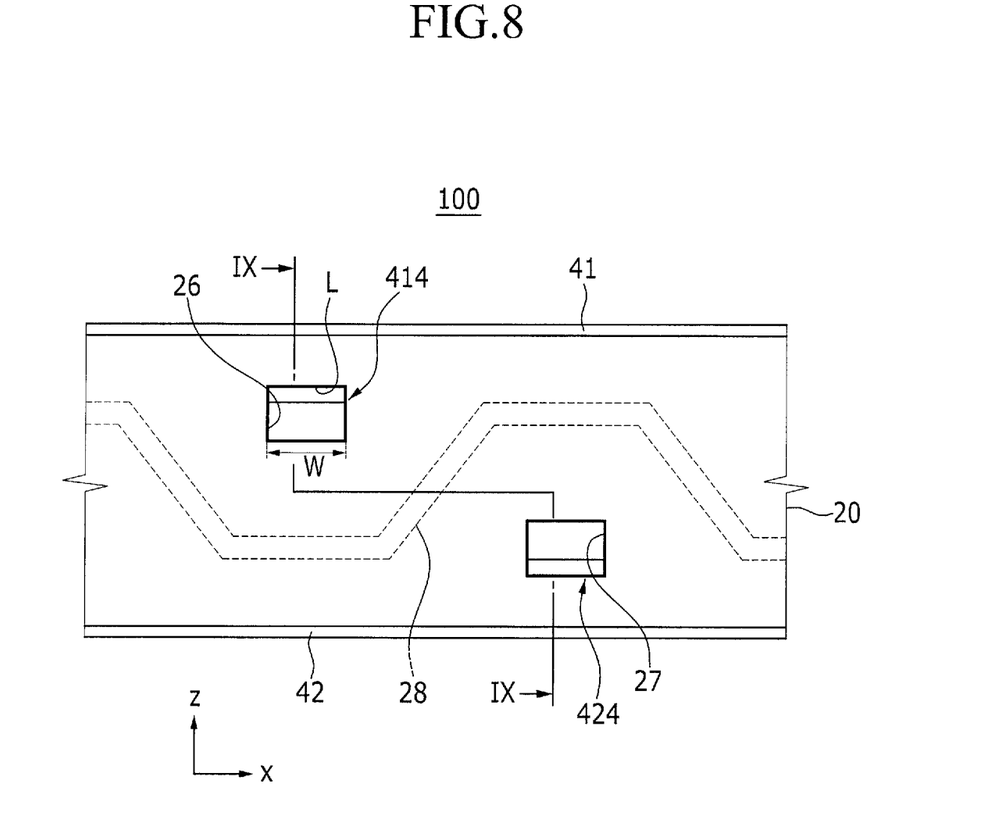
FIG. 8 is a partial side view of the pair cases being coupled in the frame.
Figure 9:
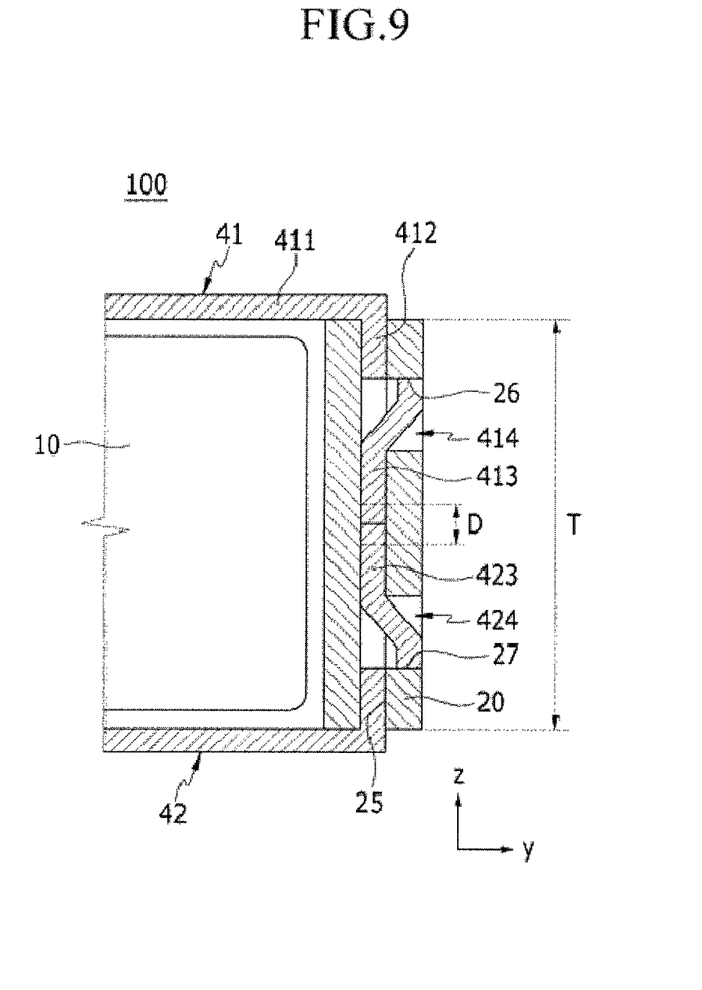
FIG. 9 is a cross-sectional view of FIG. 8, taken along the line IX-IX.

FIG. 8 is a partial side view illustrating the pair of cases 41 and 42 coupled to the frame 20, and FIG. 9 is a cross-sectional view of FIG. 8, taken along the line IX-IX. Referring to FIG. 8 and FIG. 9, the side barriers 141, the connection barrier 143, and the cutting line L form a rectangular shape in the coupling protrusion 414 of the case 41.

When the case 41 is coupled to the frame 20, the coupling protrusion 414 is coupled to the coupling groove 26 via the insertion groove 25, and in this case, a width of the connection barrier 143 substantially corresponds to (e.g., is substantially equal to) the width W of the coupling groove 26 and the side barriers 141 provided at lateral sides of the connection barrier 143 are located to be close to the inner walls of the coupling groove 26.

Thus, the case 41 may be be prevented from moving to the x-axis direction relative to the frame 20. Although it is not described in detail, when the case 42 is coupled to the frame 20, the coupling protrusion 424 is coupled to the coupling groove 27 with a similar structure as the coupling protrusion 414 coupled to the coupling groove 26.

As described, the coupling grooves 26 and 27 are located to alternate between top and bottom portions of the frame 20 in the z-axis direction and the coupling protrusions 414 and 424 are located to alternately extend along the z-axis direction in the pair of cases 41 and 42 so that a thickness T of the frame 20 can be reduced.

That is, as shown in FIG. 9, the extension portions 413 and 423 including the coupling protrusions 414 and 424 include portions that partially overlap one another in a range of the thickness T (i.e., in the z-axis direction) of the frame 20. Thus, the thickness T of the frame 20, that must be at least an overlapped distance D, may be reduced. That is, an overall thickness of the rechargeable battery pack 100 may be reduced.

Hereinafter, various other example embodiments of the present invention will be described. Descriptions of elements having been described in the above described embodiments may be omitted, and configurations that are different from those of the above described example embodiments may be described.

Figure 10:
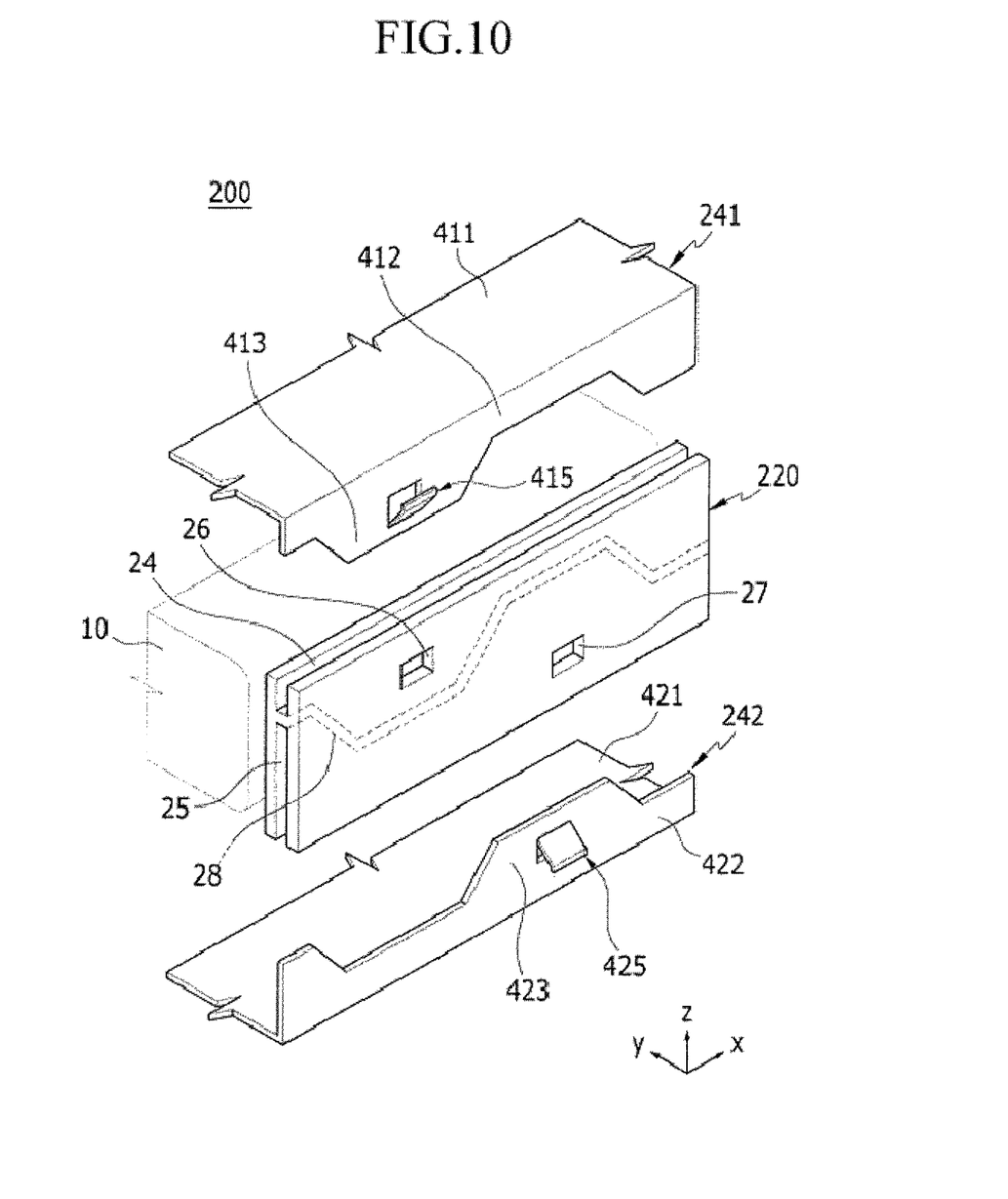
FIG. 10 is a partially exploded perspective view of a rechargeable battery pack according to a second example embodiment of the present invention.

FIG. 10 is a partially exploded perspective view of a rechargeable battery pack 200 according to a second example embodiment of the present invention. Referring to FIG. 10, in the rechargeable battery pack 200, coupling protrusions 415 and 425 of cases 241 and 242 are connected in an inclined manner (e.g., connected at an angle) to extension portions 413 and 423 and are formed by three sides of each of the coupling protrusions 415 and 425 being cut and the uncut side being press processed in each extension portions 413 and 423.

When the pair of cases 241 and 242 are inserted into insertion grooves 24 and 25, the coupling protrusions 415 and 425 elastically move back for convenience of insertion (e.g., retract along the y-axis direction), and after the insertion, elastically insert into the coupling grooves 26 and 27 (e.g., return to their original positions along the y-axis direction) due to elasticity of the coupling protrusions 415 and 425. Thus, the cases 241 and 242 and the frame 20 may be coupled (e.g., fastened) with a strong coupling force.

Figure 11:
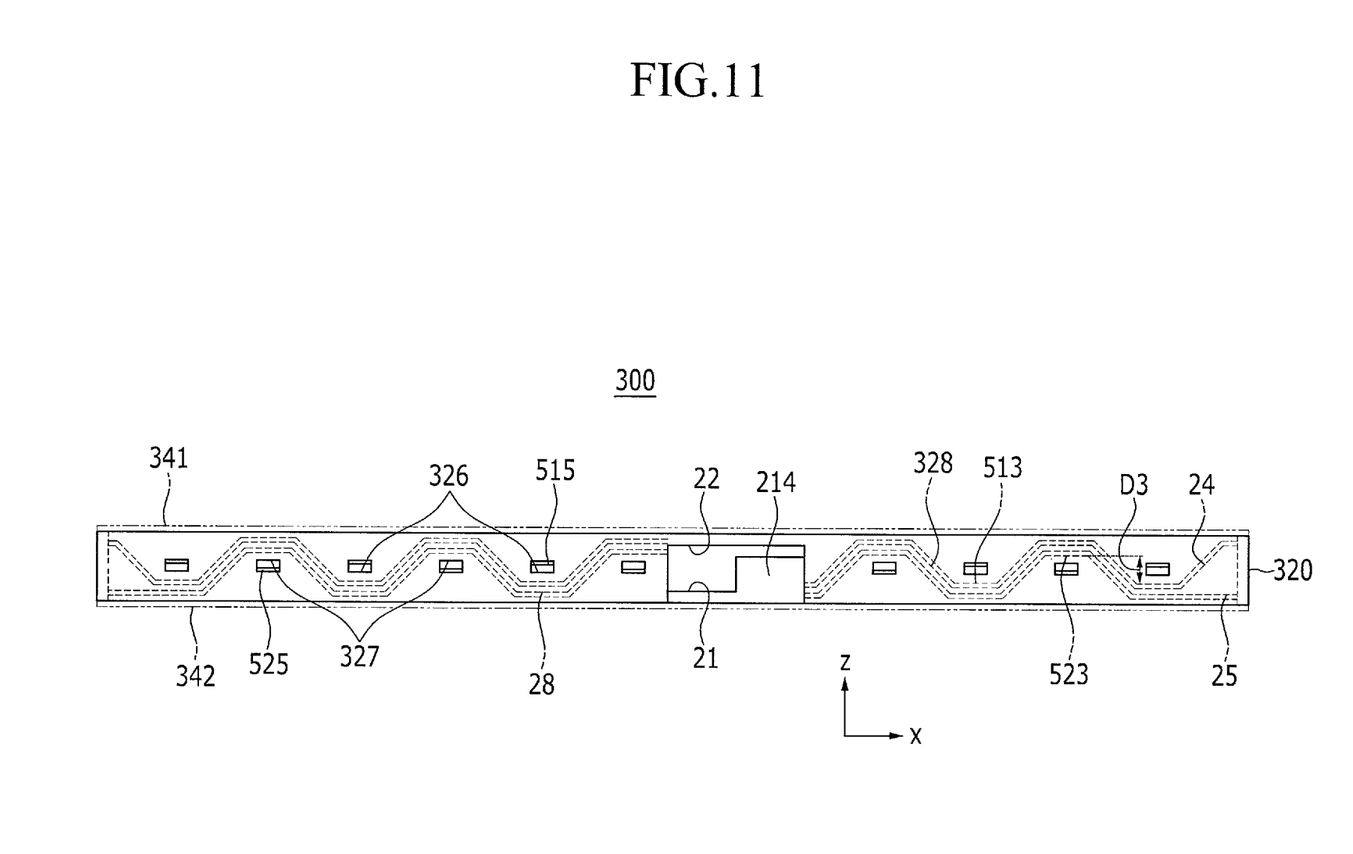
FIG. 11 is a side view of a rechargeable battery pack according to a third example embodiment of the present invention.

FIG. 11 is a side view of a rechargeable battery pack 300 according to a third example embodiment of the present invention. Referring to FIG. 11, in the rechargeable battery pack 300, coupling grooves 326 and 327 of a frame 320 are arranged along a center of the frame 320 (e.g., the center of the frame 320 along the z-axis direction). In addition, coupling protrusions 515 and 525 of the cases 341 and 342 are alternately coupled to the coupling grooves 326 and 327, respectively.

Thus, the coupling groove 326 coupled to the case 341 of the pair of cases 341 and 342 is located above a cell barrier 328, and the coupling groove 327 coupled to the other case 342 is located below the cell barrier 328. That is, the coupling grooves 326 and 327 are alternately located between an upper side and lower side of the cell barrier 328 in the z-axis direction and the cell barrier 328 extends generally along the x-axis direction (and/or y-axis direction).

In this embodiment, extension portions 513 and 523 of the cases 341 and 342 including the coupling protrusions 515 and 525 are partially overlapped in a thickness range (i.e., the z-axis direction) of the frame 320 and an overlapped distance D3 of this embodiment may be less than the overlapped distance D of the first example embodiment. Thus, the thickness of the frame 320, that must be at least the overlapped distance D3, may be reduced. That is, an overall thickness of the rechargeable battery pack 300 may be further reduced.

While this invention has been described in connection with example embodiments, it is to be understood that the invention is not limited to the disclosed embodiments, but, on the contrary, is intended to cover various modifications and equivalent arrangements included within the spirit and scope of the appended claims and their equivalents.

| Description of symbols | |
|---|---|
| 10: unit cell | 11: electrode assembly |
| 12: pouch | 13: separator |
| 14, 15: positive and negative electrodes | |
| 16, 17: positive and negative electrode lead tab | |
| 20, 220, 320: frame | 21: circuit installation portion |
| 22: penetration portion | 24, 25: insertion groove |
| 26, 27, 326, 327: coupling groove | 28, 328: cell barrier |
| 30: protection circuit module | 31: connector |
| 41, 42, 241, 242, 341, 342: case | |
| 100, 200, 300: rechargeable battery pack | |
| 121: polymer sheet | 122: PET-nylon compound sheet |
| 123: metal sheet | 141: side barrier |
| 142: inclination barrier | 143: connection barrier |
| 211, H: through-hole | 212: location setting protrusion |
| 213: circuit support protrusion | 411, 421: plate portion |
| 412, 422: insertion portion | 413, 423, 513, 523: extension portion |
| 414, 424, 415, 425, 515, 525: coupling protrusion | |
| D, D3: overlapped distance | |
| L: cutting line | T: thickness |

What is claimed is:

1. A rechargeable battery pack comprising:
   a frame accommodating a unit cell comprising a rechargeable battery;
   a protection circuit module electrically connected to the unit cell and in the frame; and
   a pair of cases coupled to opposite sides of the frame and accommodating the unit cell and the protection circuit module,
   wherein the frame has coupling grooves in the sides and insertion grooves continuously extending along the sides, the coupling grooves being alternately located in a top portion and a bottom portion of the sides of the frame along a height of the frame and being offset from each other along a first direction perpendicular to the height of the frame, the insertion grooves being configured for insertion of outer edges of the cases and open to the coupling grooves, and
   wherein each of the pair of cases comprises coupling protrusions, the coupling protrusions of each case being alternately coupled to the coupling grooves.

2. The rechargeable battery pack of claim 1, wherein the coupling grooves extend from the respective insertion grooves to the outside of the frame in a second direction perpendicular to the height of the frame.

3. The rechargeable battery pack of claim 2, wherein the frame comprises a cell barrier partitioning the insertion grooves along the height of the frame, and wherein the cell barrier is a zigzag shape alternately connecting the coupling grooves to each insertion groove.

4. The rechargeable battery pack of claim 2, wherein each of the pair of cases further comprises:
   a plate portion corresponding to the unit cell and one side of the frame;
   an insertion portion extending perpendicularly from the plate portion and located in the corresponding insertion groove; and
   extension portions extending from an end of the insertion portion and comprising the coupling protrusions.

5. The rechargeable battery pack of claim 4, wherein the coupling protrusions protrude perpendicularly from the extension portions and are coupled with the corresponding coupling grooves.

6. The rechargeable battery pack of claim 5, wherein each coupling protrusion comprises:
   a pair of side barriers extending perpendicularly from the extension portion;
   an inclination barrier extending entirely between the side barriers and extending at an angle from the extension portion; and
   a connection barrier extending entirely between the side barriers and on a parallel plane with the extension portion.

7. The rechargeable battery pack of claim 6, wherein the side barriers, a top edge of the connection barrier and a bottom edge of the inclination barrier form a rectangular shape.

8. The rechargeable battery pack of claim 6, wherein a width of the connection barrier is substantially equal to a width of the coupling groove, and wherein the side barriers are close to an inner wall of the coupling groove.

9. The rechargeable battery pack of claim 5, wherein the coupling protrusion is connected to the extension portion at an angle and three sides of the coupling protrusion are not directly connected to the extension portion.

10. The rechargeable battery pack of claim 1, wherein the frame comprises a synthetic resin material and the case comprises a metal material.

11. The rechargeable battery pack of claim 10, wherein the unit cell comprises two unit cells facing each other, and the frame comprises a circuit installation portion and the protection circuit module at a space between the two unit cells.

12. The rechargeable battery of claim 11, wherein the circuit installation portion comprises:

a through-hole at a portion corresponding to a lead tab of one of the unit cells;

a location setting protrusion protruded from a side of the through-hole and configured to set a location of the lead tab and to support the protection circuit module; and a circuit support protrusion at a corner of the circuit installation portion and protruded to be higher than the location setting protrusion and configured to support at least one side surface of the protection circuit module.

13. The rechargeable battery pack of claim 12, wherein the frame has a penetration portion extending through the frame, and a connector of the protection circuit module extends through the penetrating portion to be outside of the frame.

14. A rechargeable battery pack comprising:

a frame accommodating a unit cell comprising a rechargeable battery, the frame having coupling grooves in sides thereof and having insertion grooves at top and bottom sides and continuously extending along the sides thereof that open to the coupling grooves;

a protection circuit module electrically connected to the unit cell and in the frame; and a pair of cases coupled to opposite ones of the sides of the frame and accommodating the unit cell and the protection circuit module, each of the pair of cases comprising:

a plate portion corresponding to the unit cell and one side of the frame;

an insertion portion extending in a first direction perpendicularly from the plate portion and located in the corresponding insertion groove; and a plurality of extension portions extending from an end of the insertion portion in the first direction and being spaced from each other in a second direction perpendicular to the first direction, at least some of the extension portions comprising a coupling protrusion, wherein the coupling protrusions of each case are alternately coupled to the coupling grooves, and wherein one of the extension portions of one of the pair of cases extends in the first direction to be between two adjacent ones of the extension portions of the other one of the pair of cases in the second direction.

* * * * *